United States Patent [19]

Levin

[11] Patent Number: 5,428,920

[45] Date of Patent: Jul. 4, 1995

[54] BOBBER AND SINKER

[76] Inventor: John M. Levin, 412 Fairview Rd., Narberth, Pa. 19072

[21] Appl. No.: 240,957

[22] Filed: May 11, 1994

Related U.S. Application Data

[63] Continuation of Ser. No. 7,437, Jan. 22, 1993, abandoned.

[51] Int. Cl.$^6$ .................. A01K 93/00; A01K 95/02
[52] U.S. Cl. .................. 43/44.89; 43/44.91; 43/44.95
[58] Field of Search .............. 43/44.9, 44.91, 44.92, 43/44.89, 44.95, 44.87, 44.93

[56] References Cited

U.S. PATENT DOCUMENTS

| | | | |
|---|---|---|---|
| 1,434,335 | 10/1922 | Frost . | |
| 1,504,884 | 8/1924 | Garst | 43/44.91 |
| 2,106,618 | 1/1938 | Mehaffey | 43/44.9 |
| 2,315,048 | 1/1941 | Croft . | |
| 2,481,346 | 9/1949 | Rigby | 43/44.95 |
| 2,662,328 | 12/1953 | Oyler . | |
| 2,722,769 | 11/1955 | Blockinger | 43/44.91 |
| 2,729,015 | 9/1954 | Finnegan . | |
| 2,807,907 | 10/1957 | Brite | 43/44.91 |
| 2,983,068 | 5/1961 | Grayson | 43/44.89 |
| 3,091,050 | 8/1961 | Metzler . | |
| 3,192,662 | 7/1965 | Hoyle | 43/44.95 |
| 3,293,792 | 12/1966 | Bittaker | 43/44.89 |
| 3,415,003 | 12/1968 | Hudeley | 43/44.89 |
| 3,608,230 | 9/1971 | Hribar | 43/44.89 |
| 3,733,734 | 5/1973 | Hysaw . | |
| 3,803,749 | 4/1974 | Boyum . | |
| 4,279,092 | 7/1981 | Hutson . | |
| 4,615,136 | 10/1986 | Bank . | |
| 4,873,784 | 10/1989 | Petron | 43/44.95 |
| 4,964,236 | 10/1990 | Adams . | |
| 5,157,860 | 10/1992 | Clark | 43/44.91 |
| 5,191,731 | 3/1993 | Peterson | 43/44.92 |
| 5,203,107 | 4/1993 | O'Brien | 43/44.91 |

Primary Examiner—P. Austin Bradley
Assistant Examiner—James Miner
Attorney, Agent, or Firm—Caesar, Rivise, Bernstein, Cohen & Pokotilow, Ltd.

[57] ABSTRACT

A bobber and sinker which can be easily attached and detached from fishing lines is disclosed. The sinker is made of a single high density material, such as rubber, in which a slit has been made, to frictionally hold the fishing line. The bobber has an inner segment of high density material and an outer shell of high floatation material. A slit in the outer segment frictionally holds the fishing line. The bobber and sinker can be rapidly attached and detached from a fishing line by inserting the fishing line into the slits. Also, the bobber and sinker may be rapidly and easily positioned and repositioned along the fishing line, and the fishing line is frictionally held without the need for any operations or mechanisms to secure or hold the fishing line in place. Alternatively, to provide a sinker of higher density, the sinker can comprise an outer shell, an inner core of higher density material than the material of the outer shell, with a slit in the outer shell frictionally holding the fishing line.

19 Claims, 1 Drawing Sheet

BOBBER AND SINKER

This application is a continuation, of application Ser. No. 08/007,437, filed Jan. 22, 1993, now abandoned.

FIELD OF THE INVENTION

This invention relates to an apparatus used for fishing, and more particularly, to a bobber and sinker in which a fishing line is frictionally held and is easy to attach and detach from the fishing line.

Bobbers and sinkers which can be rapidly attached and detached from fishing lines, and in which fishing lines are frictionally held, are known. U.S. Pat. No. 4,964,236 (Adams) discusses prior art sinkers having a rubber core and a sinker which comprises a lead body including a slit which is pinched around the fishing line. Other patents which disclose sinkers with slits for insertion of the line include U.S. Pat. No. 4,615,136 (Bank) which has a molded plastic insert; U.S. Pat. No. 3,091,050 (Metzler); U.S. Pat. No. 3,803,749 (Boyum) which discloses a sinker with a plastic insert; and U.S. Pat. No. 4,279,092 (Hutson).

Patents which disclose bobbers with slits for insertion of lines include U.S. Pat. No. 2,315,048 (Croft); U.S. Pat. No. 2,729,015 (Finnegan); U.S. Pat. No. 3,733,734 (Hysaw) which discloses a slit float with a plastic material insert; U.S. Pat. No. 1,434,335 (Forst) which discloses a bobber with metallic insert; and U.S. Pat. No. 2,662,328 (Oyler) which discloses a fishing tackle retriever having an insert for attachment only, to free snagged lines made of plastic or glass.

However, the above patents do not disclose quick attachment and detachment types of sinkers which are made of a single material and have a simple slit, without any additional mechanisms or devices for securing the line after it has been inserted into the slit. Also, none of the present bobbers have an insert made of a high frictional material and an outer shell made of high floatation material, having a single slit for rapid attachment and detachment of a line, without any additional mechanisms for securing the line to the bobber.

OBJECTS OF THE INVENTION

Accordingly, it is a general object of this invention to provide a bobber and a sinker which is inexpensive, easy to manufacture, and easy to attach and detach to a fishing line.

It is a further object of this invention to provide a bobber and a sinker, which frictionally hold the fishing line, so that in the event of snags, the fishing line is free to slide within the bobber and sinker.

It is yet a further object of this invention to provide a bobber and a sinker wherein the position of the bobber and sinker along the fishing line can be easily changed or adjusted.

It is still yet a further object of this invention to provide a sinker made of a single high density material which frictionally holds the fishing line.

It is another object of this invention to provide a bobber having an outer shell of high floatation material with a high density insert which frictionally holds the fishing line.

It is yet another object of this invention to provide a bobber and a sinker which can be frictionally attached to a fishing line without the need for a locking or securing mechanism to hold the line in place.

It is still yet another object of this invention to provide a sinker which does not tend to snag or dig into the bottom of other water.

DESCRIPTION OF THE DRAWING

Other objects and many of the intended advantages of this invention will be readily appreciated when the same becomes better understood by reference to the following detailed description when considered in connection with the accompanying drawing wherein.

DETAILED DESCRIPTION OF THE PREFERRED EMBODIMENT

Figure 1:
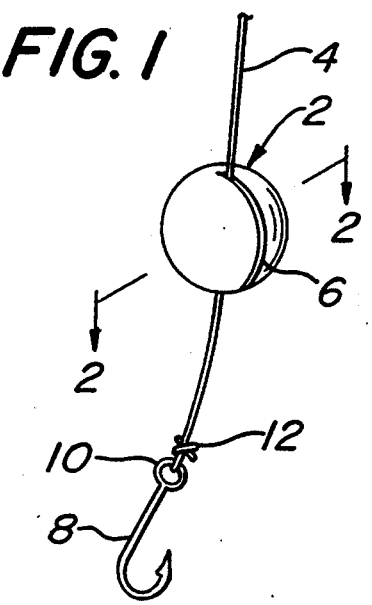
FIG. 1 is an isometric view of the sinker of the instant invention shown attached to a fishing line.

Referring now in greater detail to the various figures of the drawing, wherein like reference characters refer to like parts, the sinker 2 of the instant invention is shown in FIG. 1. The sinker is attached to a fishing line 4 by insertion of the line 4 through a slit 6 in the sinker. As further shown in FIG. 1, a fishing hook 8 is attached to the line 4 by inserting the line 4 through an eyelet 10 and making a knot 12 in the line to secure the hook 8, in a conventional manner.

Figure 2:
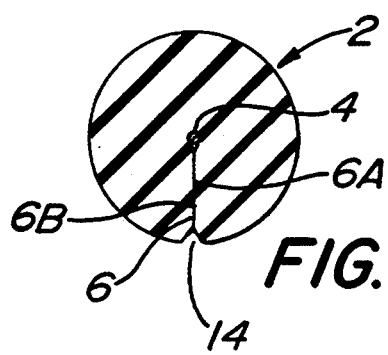
FIG. 2 is a cross-sectional view of the sinker taken along the line 2—2 of FIG. 1.

Referring now to FIG. 2, it can be seen that the slit 6 includes an enlarged, distal or outer end 14 having straight sides. This outer end 14 provides a "lead-in" for the fishing line. The inner portion of the slit extends proximally from the outer end 14 to the center of sinker 2 and has inner confronting walls 6A and 6B. The fishing line, therefore, can be easily inserted through the wider opening 14 of the slit 6 to the end of the slit where it is tightly held, by friction, by the confronting walls 6A, 6B of the slit 6.

The sinker 2 is made of a high density material, such as rubber or other suitable material, which is non-buoyant in water (i.e., which will sink in water), and which is capable of establishing the necessary frictional force with the fishing line to hold the sinker on the line during normal fishing conditions, but which permits separation of the sinker from the fishing line to prevent damage to the line when a snag is encountered. The sinker can be easily attached and detached from the fishing line and may be rapidly positioned or repositioned at any point along the fishing line. Beyond the use of a single slit, no further manipulation, operations, or mechanisms to secure or hold the line is required.

Figure 3:
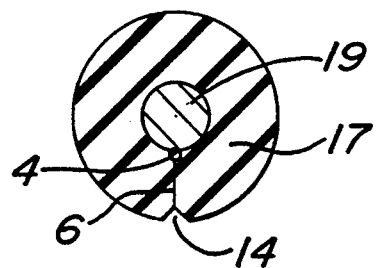
FIG. 3 is a cross-sectional view of an alternative embodiment of the sinker taken along the line 2—2 of FIG. 1.

FIG. 3 shows an alternative embodiment of the sinker 2. In this case, the sinker 2 comprises an outer shell 17 and an inner core 19. The outer shell 17 is made of high density material capable of establishing the frictional force necessary to hold the fishing line 4, such as rubber or other suitable material as used in the embodiment of FIG. 2. The inner core 19 comprises a material of even higher density material than that of the outer shell 7.

Figure 4:
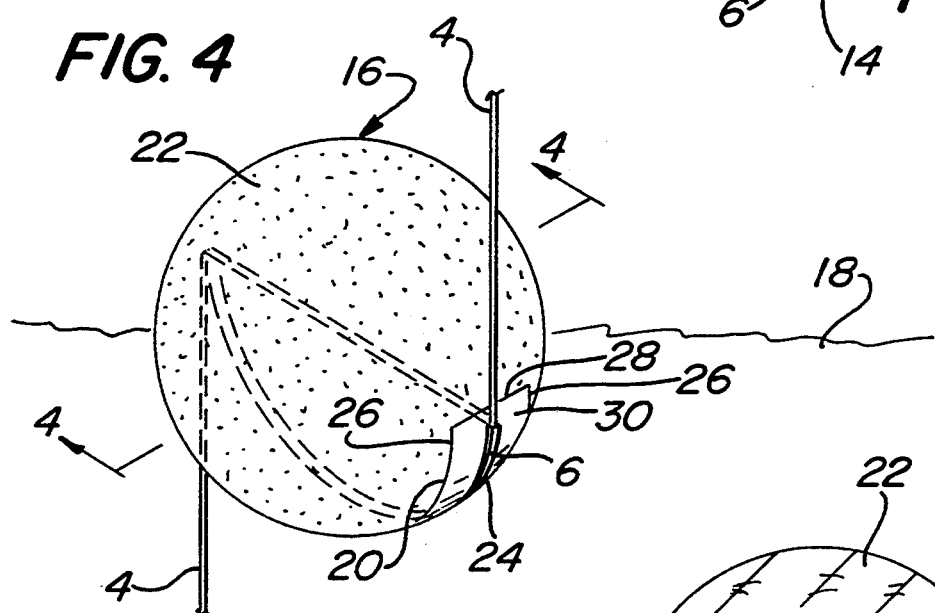
FIG. 4 is an isometric view of the bobber of the instant invention shown attached to a fishing line.

The bobber 16 of the instant invention is shown in FIG. 4, floating or "bobbing" in water 18. As is the case with the sinker 2, the bobber 16 can be easily attached and detached from the fishing line 4, simply by inserting the line 4. It should be understood that the slit 6 provided in the bobber 16 is of the same construction as the slit 6 provided in the sinker 2; preferably including a lead-in section 14 with a straight sides 15.

Figure 5:
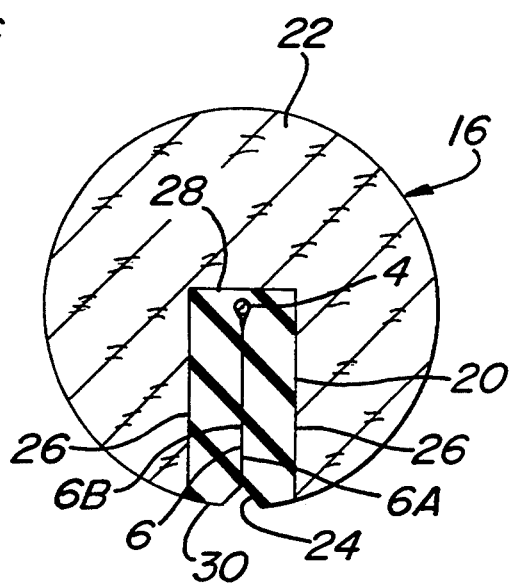
FIG. 5 is a cross-sectional view of the bobber taken along the line 4—4 of FIG. 3.

Referring now to FIGS. 4 and 5, it can be seen that the bobber 16 comprises a high density inner segment 20 surrounded by a low density, high floatation shell 22. The high density inner segment 20 provides sufficient friction to hold the fishing line 4 while the low density, high floatation shell 22 allows the bobber to float in the water 18. The inner segment 20 comprises side walls 26, a top wall 28 and an outer arcuate wall 30.

In the case of the bobber 16, the slit 6 extends from the outer arcuate wall 30 of the segment 20 to a position just short of the top wall 28. Again, the slit 6 has inner confronting walls 6A and 6B. The fishing line 4 can be inserted through the outer opening 2 and moved inwardly until it is firmly held by the walls 6A and 6B of the slit 6 in the inner segment 20.

As is the case with the sinker, the bobber may be rapidly attached and detached from the fishing line 4 without the requirement for any operations or mechanisms for locking or holding the fishing line in place beyond the friction between the core 20 and the fishing line 4. Also, the bobber 16 may be easily positioned and repositioned along the fishing line 4 by detaching it from the line 4 and moving it to a desired location.

A bobber and sinker has been described which is inexpensive, easy to manufacture, and easier to attach and detach from fishing lines than prior art bobbers and sinkers. It requires no operations or mechanisms, beyond a single slit to secure the line after the bobber or sinker has been attached. The line is frictionally held so that it may slip through the bobber and sinker to free itself in case of snags. Further, the sinker is spherical and the high density material used for the sinker will not dig into the bottom of the water and tend to get snagged or trapped, as do lead sinkers. Also, no knots are required to connect the sinker and bobber to the line, which, if required, would make them difficult to reposition and would tend to weaken the line.

In the preferred embodiment, the sinker 2 is made of hardened rubber which is sufficiently dense to sink and has a frictional coefficient to hold the line in place, but allow for slippage of the line in case of snags. However, any material of similar density and frictional characteristics, besides rubber, can be used. Alternatively, the sinker may also have a core of higher density material within another shell of material of lower density. Similarly, although the inner segment of 20 of the bobber 16 is made of hardened rubber in the preferred embodiment, any other material of similar density and frictional characteristics can be used. Finally, the shell in the preferred embodiment is made of cork, but any other low density, high floatation material with similar characteristics can be used. What is important is that the combined structure of the bobber is sufficiently light to permit it to float or "bob" in the water, to provide its intended function.

Without further elaboration the foregoing will so fully illustrate my invention that others may, by applying current or future knowledge, readily adapt the same for use under various conditions of service.

I claim:

1. A bobber and sinker combination for use with a fishing line, said sinker being made of a single high density, non-metallic material, said bobber having an inner segment of high density, non-metallic material and an outer shell of low density high floatation material, said combination further comprising means for rapidly and easily attaching and detaching said bobber and sinker to, and from, said line and means for frictionally securing said fishing line to said bobber and sinker after they have been attached to said fishing line and wherein said bobber and sinker have outer surfaces and said means for attaching and detaching said bobber and sinker to, and from, said fishing line comprises a first slit in said sinker and a second slit in said inner segment of said bobber, said first and second slits comprising straight, planar, confronting walls and extending inwardly in a single straight line from said outer surfaces of said sinker and bobber respectively.

2. The bobber and sinker combination of claim 1 wherein said high density, non-metallic material of said sinker and said inner segment of high density, non-metallic material of said bobber have a coefficient of friction which frictionally secures said fishing line when said fishing line abuts the sides of said slits in said inner segment of said bobber and in said sinker.

3. The bobber and sinker combination of claim 2 wherein said high density, non-metallic material of said sinker comprises rubber.

4. The bobber and sinker combination of claim 3 wherein said high density, non-metallic material of said inner segment of said bobber comprises rubber and said outer shell of said bobber comprises cork.

5. The bobber and sinker combination of claim 4 wherein said bobber and said sinker are spherical in shape.

6. The bobber and sinker combination of claim 1 wherein said high density, non-metallic material of said sinker comprises rubber.

7. The bobber and sinker combination of claim 6 wherein said high density, non-metallic material of said inner segment of said bobber comprises rubber and said outer shell of said bobber comprises cork.

8. A bobber comprising an outer shell of low density, high floatation material, said outer shell including an outer surface and an inner segment of high density, non-metallic material housed within said outer shell, said outer shell with said segment housed therein having an outer, generally spherical surface having no projections therefrom and said bobber further comprising means for rapidly and easily attaching said bobber to, and detaching said bobber from, a fishing line and means for frictionally securing said fishing line when said bobber has been attached to said fishing line comprising a slit in said inner segment having straight planar confronting walls, said slit extending inwardly in a single straight line from said outer surface.

9. The bobber of claim 8 wherein said means for rapidly attaching and detaching said bobber from said fishing line comprises said slit.

10. The bobber of claim 9 wherein said high density material non-metallic material which has a coefficient of friction sufficient to frictionally secure said line when said line abuts the sides of said slit.

11. The bobber of claim 10 wherein said high density, non-metallic inner segment comprises rubber and said high floatation material of said outer segment comprises cork.

12. The bobber of claim 8 wherein said high density non-metallic inner segment comprises rubber and said high floatation material of said outer shell comprises cork.

13. A sinker comprising an outer shell and an inner segment, said outer shell comprising a first material having an outer surface and said inner segment comprising a second material, said inner segment being completely housed within said outer shell, and said sinker comprising means for rapidly attaching said sinker to, and detaching said sinker from, a fishing line, and means for frictionally securing said fishing line to said sinker after said sinker has been attached to said fishing line and comprising a slit in said outer shell having straight planar confronting walls extending inwardly in a single straight line from said outer surface.

14. The sinker of claim 13 wherein said first material comprises rubber.

15. The sinker of claim 13 wherein said sinker is spherical in shape.

16. The sinker of claim 13 wherein said means for rapidly attaching said sinker to, and detaching said sinker from, said fishing line comprises said slit.

17. The sinker of claim 16 wherein said slit comprises a lead-in section located at said outer surface.

18. The sinker of claim 17 wherein said first material has a coefficient of friction which frictionally holds said line when said line abuts the sides of said slit.

19. The sinker of claim 18 wherein said first material comprises rubber.

* * * * *